(12) United States Patent
Ryner et al.

(10) Patent No.: US 11,120,415 B2
(45) Date of Patent: Sep. 14, 2021

(54) SYSTEM AND METHOD FOR A DISTRIBUTED DATA MANAGEMENT SYSTEM

(71) Applicant: Walmart Apollo, LLC, Bentonville, AR (US)

(72) Inventors: Douglas Jahe Ryner, Rogers, AR (US); David Martin Nelms, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 467 days.

(21) Appl. No.: 15/702,056

(22) Filed: Sep. 12, 2017

(65) Prior Publication Data
US 2018/0075425 A1   Mar. 15, 2018

Related U.S. Application Data (60) Provisional application No. 62/394,379, filed on Sep. 14, 2016.

(51) Int. Cl.

| | | |
|---|---|---|
| *G06Q 20/18* | (2012.01) | |
| *G06F 16/27* | (2019.01) | |
| *G06F 16/955* | (2019.01) | |
| *G06Q 20/32* | (2012.01) | |
| *G06Q 20/20* | (2012.01) | |
| *G06F 16/93* | (2019.01) | |
| *G06Q 20/04* | (2012.01) | |
| *G06F 3/0482* | (2013.01) | |

(52) U.S. Cl.
CPC ............ *G06Q 20/18* (2013.01); *G06F 16/27* (2019.01); *G06F 16/93* (2019.01); *G06F 16/955* (2019.01); *G06Q 20/047* (2020.05); *G06Q 20/209* (2013.01); *G06Q 20/3221* (2013.01); *G06Q 20/3276* (2013.01); *G06F 3/0482* (2013.01)

(58) Field of Classification Search
CPC .. G06Q 20/18; G06Q 20/047; G06Q 20/3221; G06Q 20/209; G06Q 20/3276; G06Q 16/93; G06Q 16/27; G06F 16/955; G06F 3/0482
USPC ............................................................ 705/16
See application file for complete search history.

(56) References Cited

U.S. PATENT DOCUMENTS

| | | | | |
|---|---|---|---|---|
| 5,642,485 | A | * | 6/1997 | Deaton ............... G06Q 20/387 |
| | | | | 705/14.25 |
| 6,129,274 | A | | 10/2000 | Suzuki |
| 6,321,210 | B1 | | 11/2001 | O'Brien et al. |
| 6,580,440 | B1 | | 6/2003 | Wagner et al. |
| 7,195,157 | B2 | | 3/2007 | Swartz et al. |

(Continued)

OTHER PUBLICATIONS

NCR introduces personalization platform for self-checkout terminals, NCR, Jan. 9, 2011.

(Continued)

*Primary Examiner* — Garcia Ade
(74) *Attorney, Agent, or Firm* — Fitch, Even, Tabin & Flannery LLP (57) ABSTRACT

A distributed data management system is described. Document images stored by a first computing system may be retrieved by a broker system communicating with a user's mobile device that is interacting with a second computing system. The retrieved document images may be transmitted by the broker system for integration into a graphical user interface of the second computing system.

20 Claims, 9 Drawing Sheets

(56) References Cited

U.S. PATENT DOCUMENTS

| | | |
|---|---|---|
| 7,635,084 B2 | 12/2009 | Wang et al. |
| 8,346,634 B2 | 1/2013 | Shiftan et al. |
| 8,515,439 B2 | 8/2013 | Urie |
| 8,615,439 B2 | 12/2013 | Ramaratnam et al. |
| 8,626,595 B2 | 1/2014 | Chung |
| 8,650,124 B2 | 2/2014 | Singh |
| 8,849,683 B2 | 9/2014 | Smith |
| 9,027,827 B2 | 5/2015 | Dessert et al. |
| 9,152,999 B2 | 10/2015 | Argue et al. |
| 9,330,382 B2 | 5/2016 | Argue et al. |
| 10,937,024 B2 | 3/2021 | Ryner |
| 2002/0117544 A1 | 8/2002 | Wolf et al. |
| 2003/0217892 A1 | 11/2003 | Persky |
| 2004/0064368 A1 | 4/2004 | Koser |
| 2008/0071614 A1 | 3/2008 | Mebruer |
| 2008/0189170 A1 | 8/2008 | Ramachandra |
| 2012/0084135 A1 | 4/2012 | Nissan et al. |
| 2013/0085875 A1 | 4/2013 | Lamba |
| 2013/0132854 A1 | 5/2013 | Raleigh |
| 2013/0159090 A1 | 6/2013 | Boal |
| 2013/0238456 A1 | 9/2013 | Soysa |
| 2013/0325612 A1 | 12/2013 | Sommerville et al. |
| 2015/0154686 A1 | 6/2015 | Lawrence |
| 2015/0371254 A1 | 12/2015 | Pugh et al. |
| 2016/0034872 A1* | 2/2016 | Hendrick ........... G06Q 30/0207 705/16 |
| 2016/0224955 A1 | 8/2016 | Domeracki |
| 2016/0283925 A1 | 9/2016 | Ratnakar |
| 2017/0024804 A1 | 1/2017 | Tepfenhart, Jr. |
| 2017/0221040 A1 | 8/2017 | Ringo |
| 2018/0075449 A1 | 3/2018 | Ryner |
| 2018/0075503 A1 | 3/2018 | Ryner |

OTHER PUBLICATIONS

3M TM SelfCheck QuickConnect Interface, Administrator's Guide, 2014.

Print of sales receipts—In-app setup, Selling in person—Shopify Help Center, https://help.shopify.com/manual/sellinperson/setup/receipts, last viewed Jun. 17, 2016.

Temwork Retail, Our cloud-based retail POS System: Defining Mobility in Retail Spaces with our Cloud-Based Retail POS System, http://www.teamworkretail.com/ourcloudbasedretailpossystem/, last viewed Jun. 16, 2016.

USPTO; U.S. Appl. No. 15/702,015; Office Action dated Oct. 21, 2019.

USPTO; U.S. Appl. No. 15/702,015; Office Action dated Oct. 27, 2020.

USPTO; U.S. Appl. No. 15/702,015; Office Action dated Apr. 27, 2021.

USPTO; U.S. Appl. No. 15/702,015; Office Action dated Apr. 30, 2020.

USPTO; U.S. Appl. No. 15/702,079; Notice of Allowance dated Oct. 26, 2020.

USPTO; U.S. Appl. No. 15/702,079; Office Action dated Oct. 3, 2019.

USPTO; U.S. Appl. No. 15/702,079; Office Action dated Mar. 27, 2020.

USPTO; U.S. Appl. No. 15/702,079; Office Action dated May 22, 2019.

* cited by examiner

SYSTEM AND METHOD FOR A DISTRIBUTED DATA MANAGEMENT SYSTEM

CROSS-REFERENCE TO RELATED PATENT APPLICATIONS

This application claims priority to U.S. Provisional Application No. 62/394,379 filed on Sep. 14, 2016, the content of which is hereby incorporated by reference in its entirety.

BACKGROUND

Electronic documents and data associated with a user may be saved for later review. Frequently these documents may be saved by the user on a home computing device or storage medium to which the user has access. Additionally, documents and other data associated with the user may be saved by other entities with which the user interacts.

BRIEF DESCRIPTION OF DRAWINGS

The accompanying figures, which are incorporated in and constitute a part of this specification, illustrate one or more embodiments of the present invention and, together with the description, help to explain the present invention. The embodiments are illustrated by way of example and should not be construed to limit the present invention. In the figures

DETAILED DESCRIPTION

Described in detail herein are systems and methods for a distributed data management system. In an exemplary embodiment, stored information stored at a first computing system can be integrated into a graphical user interface provided by a second computing system with the aid of a broker system. More particularly, communication between the broker system and an application execution on a mobile device of a user interacting with the second computing system may be established. The application on the mobile device may provide the broker system with an identification of the second computing system and an identifier for a user operating the mobile device. The identifier can be associated with an account tied to the first computing system and may be used by the broker to query a first database communicatively coupled to the first computing system to retrieve account informant associated with the account. The broker system may transmit the first set of information to the second computing system for integration into the graphical user interface provided by the second computing system so as to display the first set of information as an image in the graphical user interface. In one embodiment, first set of information may correspond to a stored electronic receipt and the image may be of the electronic receipt.

Figure 1A:
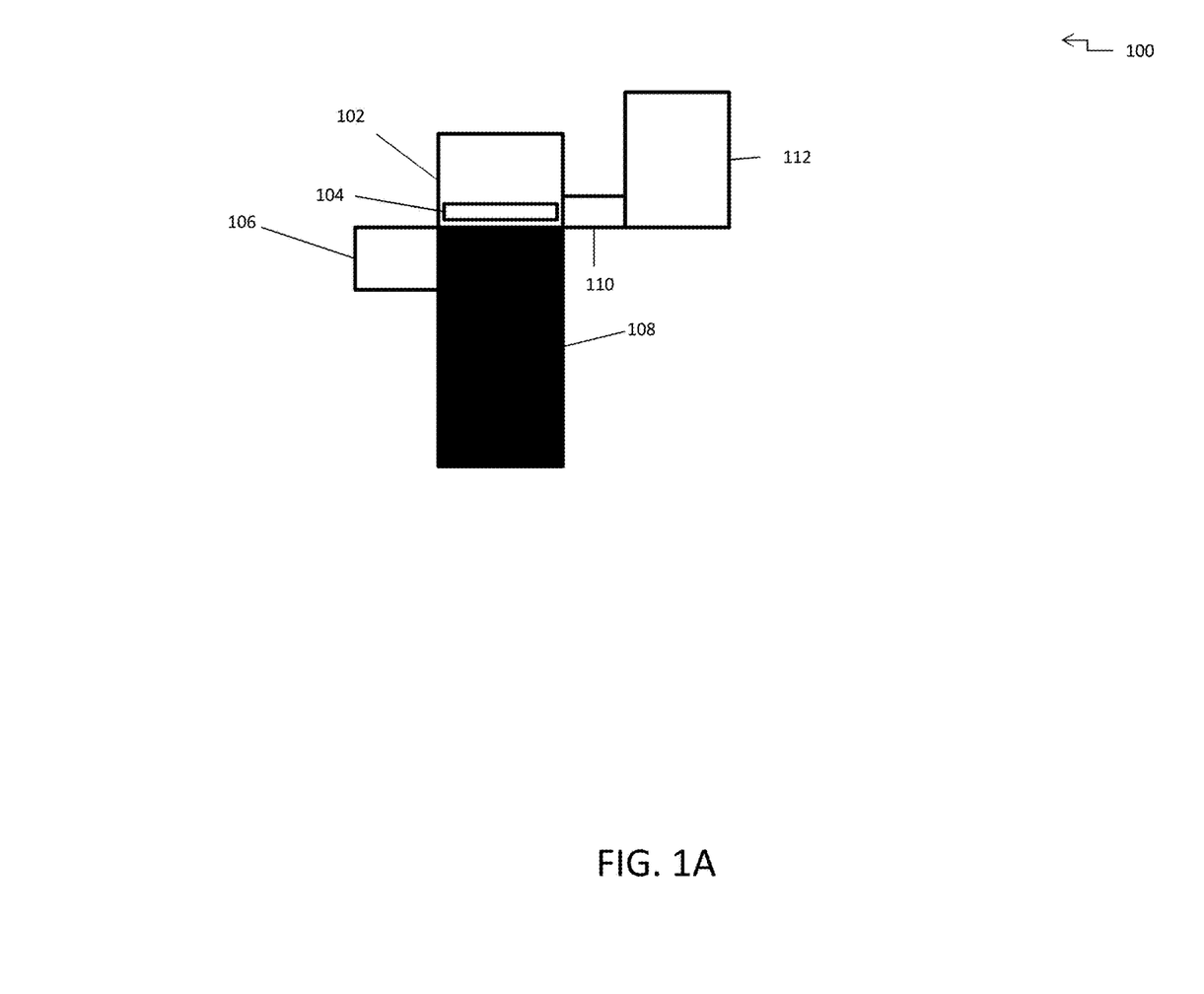
FIG. 1A is a block diagram of a second computing system configured to be integrated with a first computing system in accordance with an exemplary embodiment.

FIG. 1A is a block diagram of a second computing system configured to identify and display retrieved information from a first computing system in accordance with an exemplary embodiment. The second computing system 100 can be located in a facility and physical objects can be disposed in the facility. The second computing system 100 can include a display 102, a reader 110, a scanner 104, a scale 106, and printer 112. The computing system 100 can be placed on a base 108. It will be appreciated that he the second computing system 100 also includes multiple other non-illustrated components.

A graphical user interface generated by the second computing system may be displayed on the display 102. The scanner 104 can be an optical scanner configured to read and decode machine-readable elements. The machine-readable elements can be barcodes, QR codes, RFID tags, or types of machine-readable elements detectable by Near Field Communication Devices (NFC). The machine-readable elements can be encoded with an identifier. The identifier can be associated with physical objects disposed at the facility or in one embodiment, the user's account. The display 102 can be configured to display information associated with the physical objects and information associated with the at least one account. The reader 110 can be configured to read and decode information in magnetic card strips or a card chip. The printer 112 can be configured to print information associated with the displayed information. The scale 106 can be an electronic weighing machine configured to determine a weight of an object placed on the scale. In some embodiments, the scale can be an analog or digital scale that calculates the weight of objects using one or more strain gauges or other suitable devices that can convert a force applied to the scale by an object (e.g., from gravity) to an electrical signal.

Figure 1B:
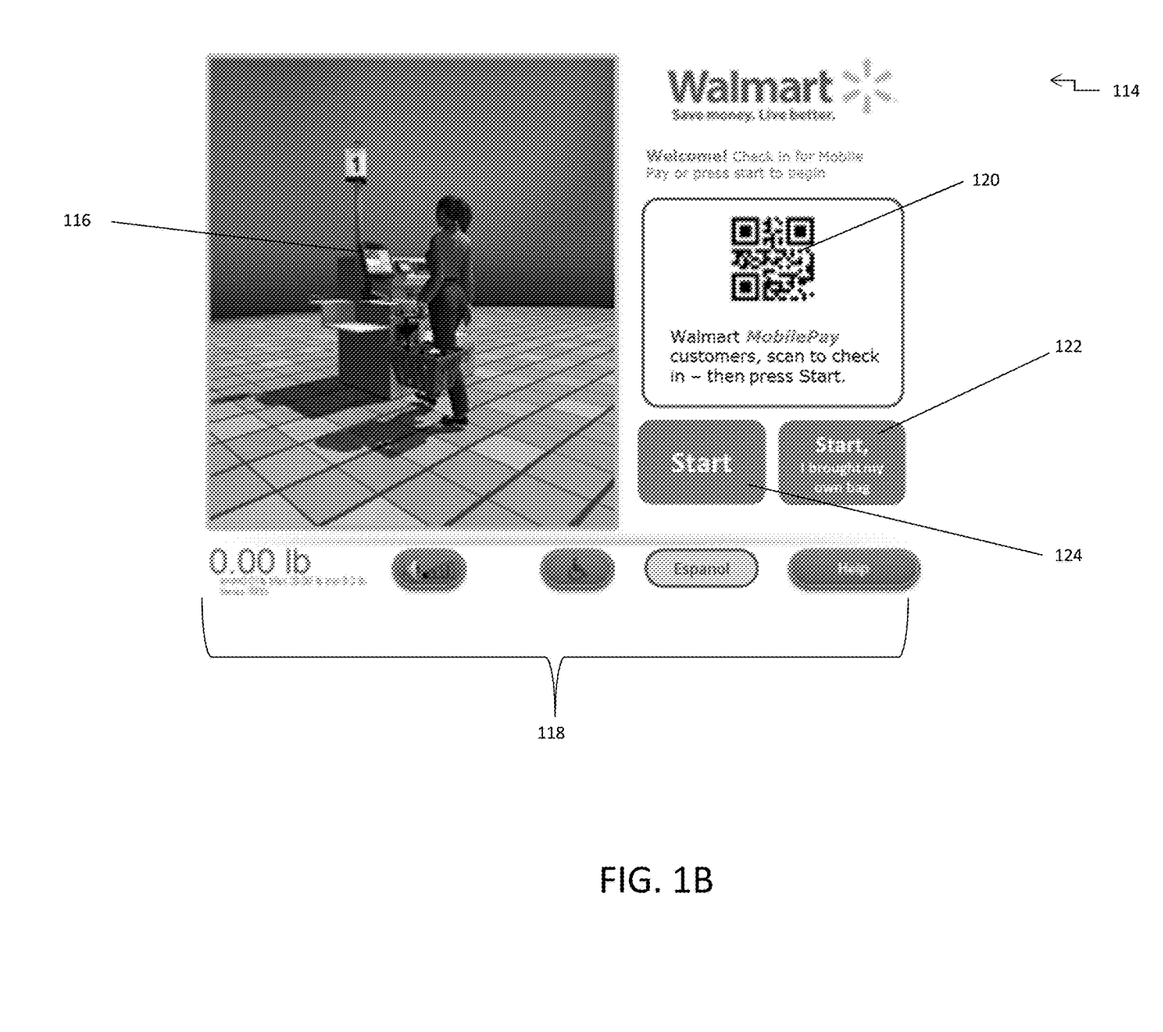
FIG. 1B is a view of an interface on the display of the second computing system before retrieving information from the first computing system in accordance with an exemplary embodiment.
Figure 1C:
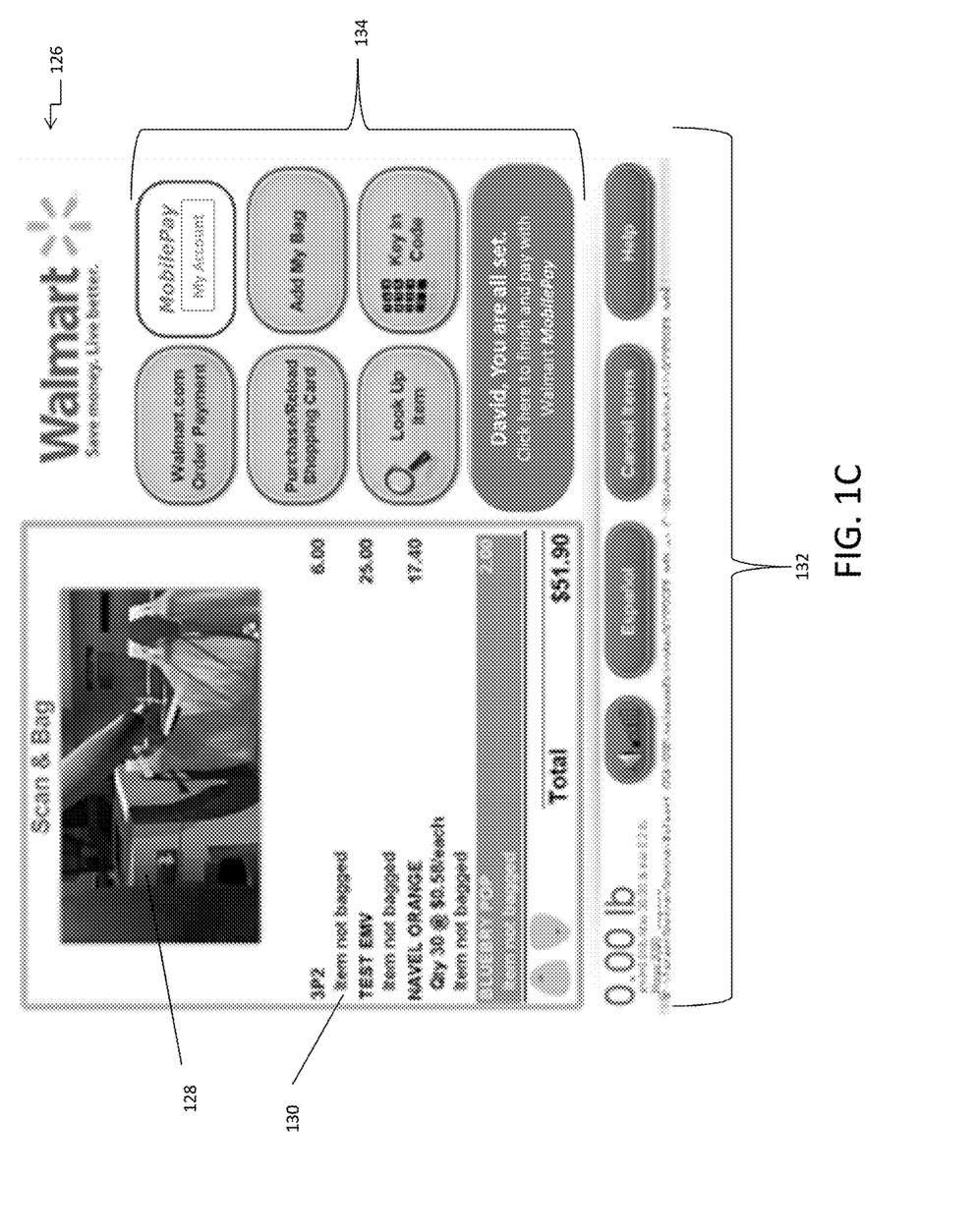
FIG. 1C is a view of an interface on the display of the second computing system after retrieving information from the first computing system in accordance with an exemplary embodiment.

FIG. 1B is a view of an interface on the display of the second computing system before retrieving information from the first computing system in accordance with exemplary embodiments. In one embodiment, the second computing system (e.g. second computing system 100 as shown in FIG. 1A) can be a Point-Of-Sale (POS) terminal in a retail store with a cash drawer and transaction receipt roll. The second computing system can display interface 114 on the display (e.g. display 102 as shown in FIG. 1A). For example, interface 114 can include an instructional image 116, interface customization options 118 such as volume control, accessibility for the physically disabled, language options and a selection for "Help" if assistance is needed. Furthermore, interface 114 can also include a display of a weight of an object put on the scale (e.g. scale 106 as shown in FIG. 1A).

The interface 114 can further display a machine-readable element 120 such as a barcode or a QR code. The machine-readable element 120 can be encoded with an identifier of the second computing system. In exemplary embodiments, the machine-readable element 120 can be scanned by an application executing on a user's mobile device. The application can decode the machine-readable element after scanning to extract an identification of the second computing system. The identification of the second computing system and an identifier for the user of the mobile device may be sent by the application to a broker system. The broker system may use the identifier to access an account of the user via a first computing system that has stored data related to the user. In one embodiment, the first computing system may be an online store. Retrieved information from the account may be transmitted by the broker system to the second computing system for integration into the graphical user interface being provided on the display. In one embodiment, the information may provide the user with a selection choice to obtain additional information from the first computing system. For example, the user may be provided a choice to find and retrieve images of electronic receipts from previous transactions to the second computing system from the first computing system via the broker system. Subsequent to scanning the machine-readable element 120, either of the "Start" buttons 122, 124 can be selected.

FIG. 1C-F are views of an interface on the display of the second computing system after retrieving information from the first computing system in accordance with exemplary embodiments. The second computing system (e.g. second computing system 100 as shown in FIG. 1A) can be located in a physical retail facility. In one embodiment, the first computing system can be a virtual retail store. The second computing system can be configured to retrieve and display information associated with an account tied to the first computing system. Furthermore, the second computing system can be used to complete transactions associated with items (or physical objects). The second computing system can include an interface 126 on the display (e.g. display 102 as shown in FIG. 1A). The interface 126 can include an instructional image 128 and information associated with scanned items 130. The information associated with scanned items 130 can include but is not limited to: a name of the physical object, a brand of the physical object, a quantity of the items scanned, and a price of each physical object. The information associated with the scanned items 130 can also include a total amount due. The interface 126 can include selection buttons 134. The selection buttons 134 can be displayed after the second computing system retrieves information associated with an account stored by another computing system. The account can be associated to an account holder. The account holder information can be accessed by the second computing system via the broker system retrieving information associated with the account from the first computing system. The selection buttons 134 can include selections specific to the account. For example, selection buttons 134 can include a mobile account selection associated with the account, a selection option to complete an order associated with the account, and a selection to purchase or reload a shopping card associated with the account. The selection buttons 134 can include various selection buttons such as selection buttons for looking up an item, a button for looking up an item and a key in code button.

Figure 1D:
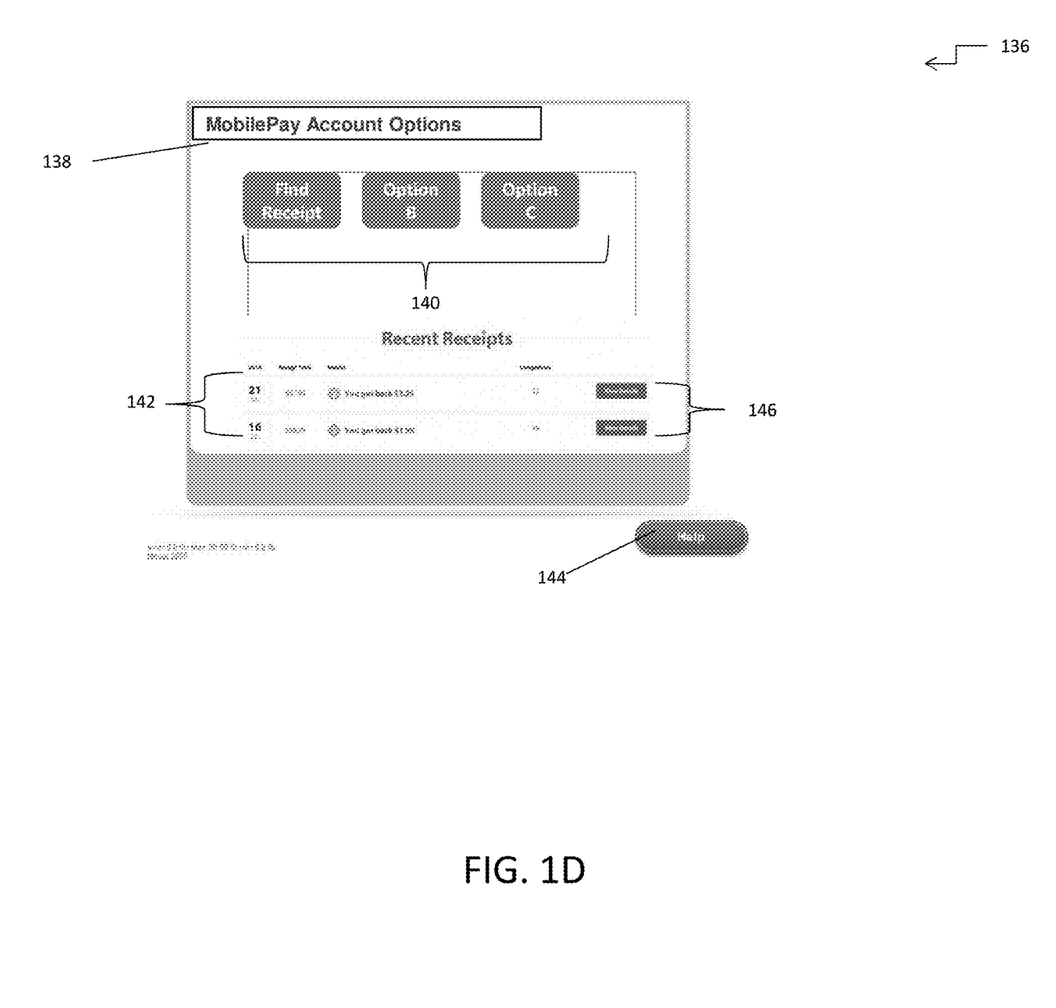
FIG. 1D is a view of an interface on the display of the second computing system after retrieving information from the first computing system in accordance with an exemplary embodiment.

FIG. 1D depicts an exemplary interface 136 in an exemplary embodiment. Interface 136 can be displayed on the display (e.g. display 102 as shown in FIG. 1A) of the second computing system (e.g. second computing system 100 as shown in FIG. 1A) after the retrieving information associated with an account from the first computing system. As an example, the first computing system can be an virtual retail store and the second computing system can be located at a physical retail store. The first computing system may store data associated with the user. For example, the first computing system may store multiple documents associated with transactions completed by the user in the via the first computing system. In one example, the documents stored may be receipts for the transactions conducted by the user via the first computing system. The second computing system may receive information regarding the receipts from the broker system and may integrate broker system the receipts from the first computing system and may display information associated with the receipts on the interface 136. In one embodiment, the information may be an image of the electronic receipts. The interface 136 can include multiple account options 140. The account options 138 can include multiple selection buttons 140 including a selection button for finding receipts associated with the account. Furthermore, the interface 136 can display the most receipt receipts 142 associated with the account and the details of the most recent receipts can be viewed by selecting the "View Details" selection button 146. In one embodiment, a selection button for "Help" 144 is also available if assistance is needed. It will be appreciated that interface 136 and the other interfaces described herein may also include other user interface elements in addition to, or instead of, those specifically described herein.

Figure 1E:
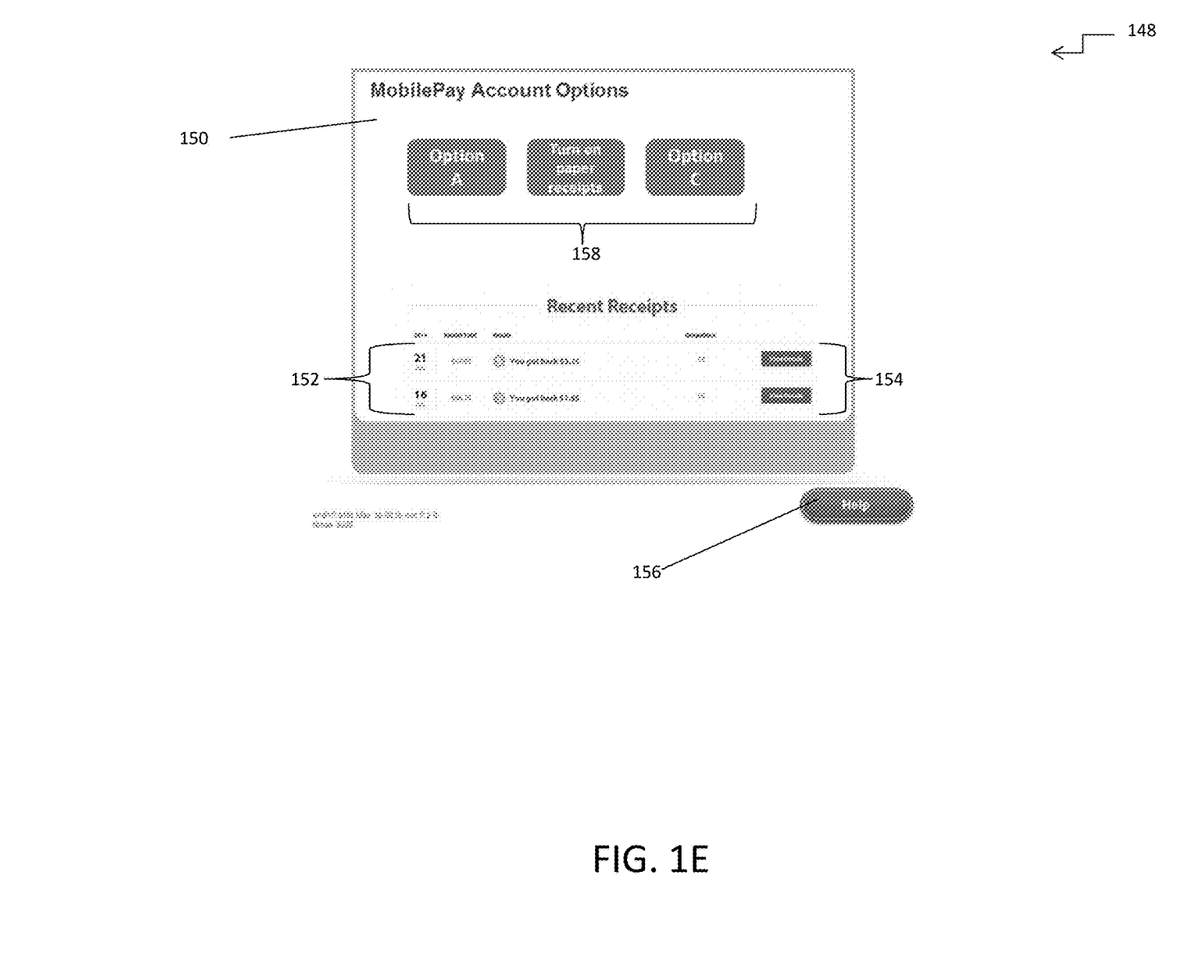
FIG. 1E is a view of an interface on the display of the second computing system after retrieving information from the first computing system in accordance with an exemplary embodiment that is used to display information associated with an electronic receipt.

FIG. 1E is a view of an interface on the display of the second computing system after retrieving information from the first computing system in accordance with an exemplary embodiment that is used to display information associated with an electronic receipt. An interface 148 is displayed on the display (e.g. display 102 as shown in FIG. 1A) of the second computing system (e.g. second computing system 100 as shown in FIG. 1A) after retrieving information associated with an account from the first computing system. The second computing system can be configured to retrieve the receipts associated with the account from the first computing system via the broker system and display information associated with the receipts on the interface 148. The interface 148 can include multiple account options 150 associated with an application executing on the user's mobile device. The account options 150 can include multiple selection buttons 158 including a selection button for "turning on paper receipts". In response to selecting "turning on paper receipts" the second computing system can update preferences of an account including the preference to print the receipts when at a second computing system. Furthermore, the interface 148 can display information associated with the most receipt receipts 152 associated with the account and further details of the most recent receipts can be viewed by selecting a "View Details" selection button 154. In one embodiment, a selection button for "Help" 156 is also available if assistance is needed.

Figure 1F:
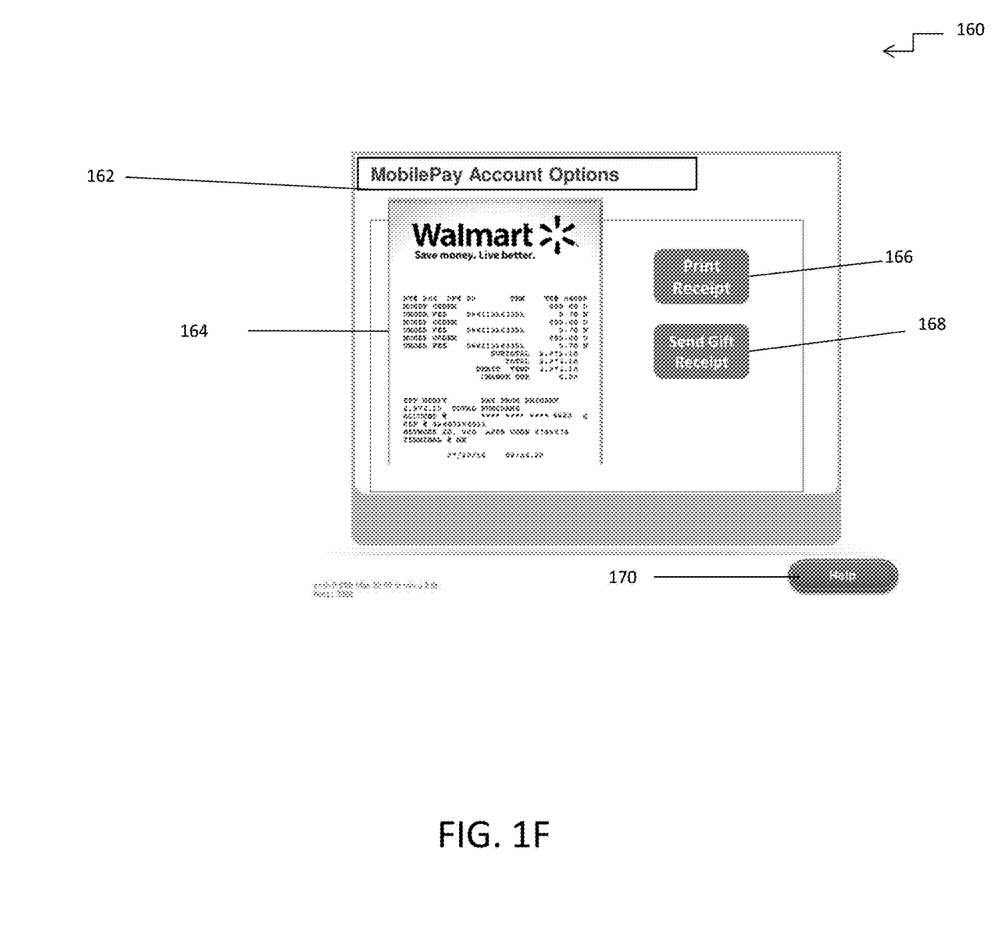
FIG. 1F is a view of an interface on the display of the second computing system after retrieving information from the first computing system in accordance with an exemplary embodiment that is used to display an image of an electronic receipt.

FIG. 1F is a view of an interface on the display of the second computing system after retrieving information from the first computing system in accordance with an exemplary embodiment that is used to display an image of an electronic receipt; The interface 160 is displayed on the display (e.g. display 102 as shown in FIG. 1A) of the second computing system (e.g. second computing system 100 as shown in FIG.

1A) after the retrieving of information associated with an account from the first computing system. The second computing system can be configured to retrieve the receipts associated with the account from the first computing system via the broker system and display information associated with the receipts on the interface 160. More particularly, the interface 160 can receive a selection to view the details of a receipt as an account option 162. In response to receiving a selection to view the details of a receipt, the second computing system can be configured to access the image of the receipt 164 (retrieved by the broker system) and integrate and display the image of the receipt 164 in the graphical user interface of the display of the second computing system. The image of the receipt 164 can include the completed transactions along with the item information. The interface 160 can include a selection button for "Print Receipt" 166. In response to receiving the selection for "Print Receipt" the second computing system can print the image of the receipt 164 using the printer (e.g. printer 112 as shown in FIG. 1A). The interface 160 can also include a selection for "Send a Gift Receipt" 168. In response to receiving a selection for "Send a Gift Receipt" 168 the second computing system can prompt a request for an e-mail address. The second computing system can configure and format the image of the receipt 164 (i.e. remove the price information associated with the items) and transmit the configured and formatted image of the receipt 164 as an e-mail attachment to the provided e-mail address. In one embodiment, a selection button for "Help" 170 is also available if assistance is needed.

Figure 2:
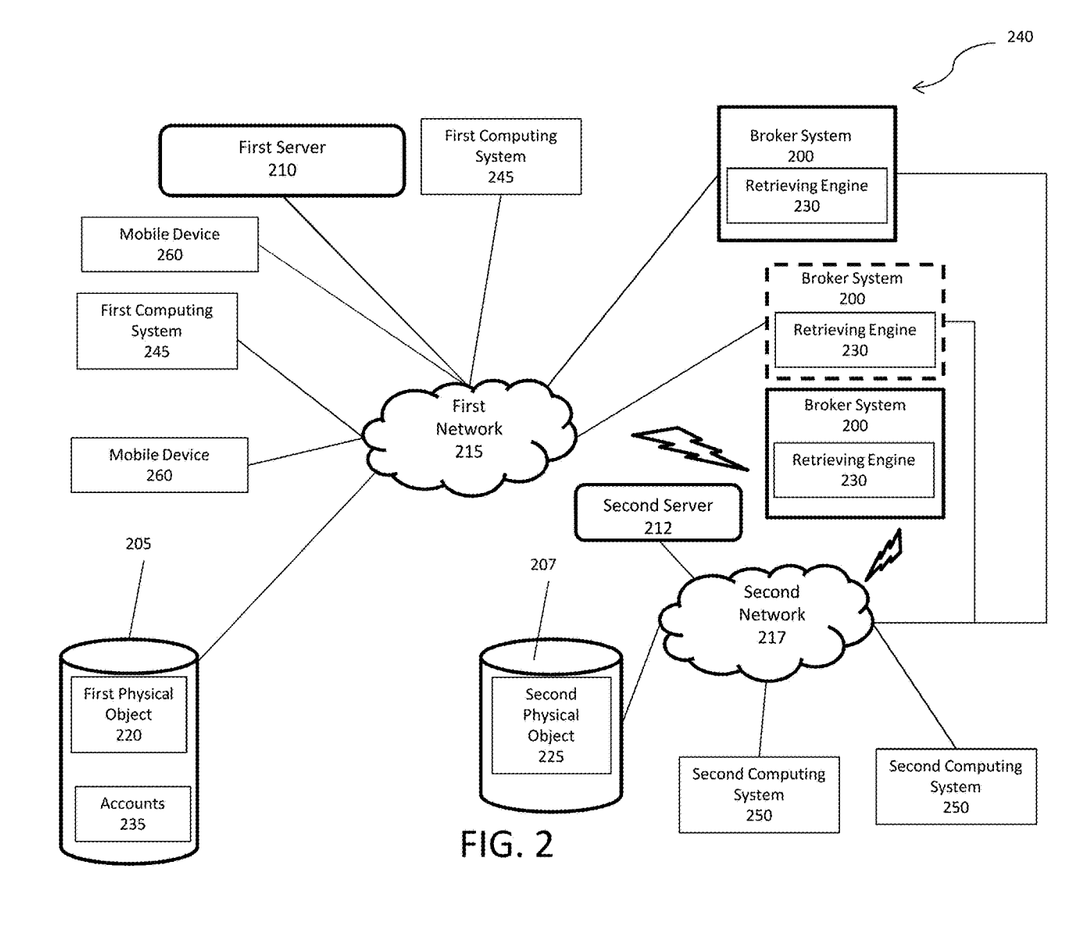
FIG. 2 is a network diagram for a distributed management system according to an exemplary embodiment.

FIG. 2 illustrates an exemplary data management system in accordance with an exemplary embodiment. The data management system 240 can include a first database 205, a second database 207, a first server 210, a second server 212, one or more of first computing systems 245, multiple instances of the broker systems 200, one or more of the second computing systems 250 and one or more mobile devices 260. In exemplary embodiments, the first computing system 245 can be in communication with the first database(s) 205, the first server(s) 210, the mobile devices 260, and the broker systems 200, via a first communications network 215. The second computing system 250 can be in communication with the second database(s) 207, the second server(s) 212, and the broker systems 200, via second communication network 217. The broker system 200 can implement at least one instance of the integration engine 230.

In an example embodiment, one or more portions of the first and second communications network 215, 217 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The first server 210 includes one or more computers or processors configured to communicate with the first computing system 245, the broker system 200 and the first databases 205, via the first network 215. The server 210 hosts one or more applications configured to interact with one or more components first computing system 245 and the broker system 200 and/or facilitates access to the content of the databases 205. The second server 210 includes one or more computers or processors configured to communicate with the second computing system 250, the broker system 200 and the second databases 207, via the first network 217. The second server 212 hosts one or more applications configured to interact with one or more components second computing system 250 and the broker system 200 and/or facilitates access to the content of the databases 207. In some embodiments, the first or second server 212 can host the integration engine 230 or portions thereof. The first databases 205 may store information/data, as described herein. For example, the first databases 205 can include first physical objects database 220 and an accounts database 235. The first physical objects database 220 can store information associated with physical objects disposed at various facilities. The accounts database 235 can store account holder information and sessions of the account holders with the first computing system 245. The first databases 205 and first server 210 can be located at one or more geographically distributed locations from each other or from the first computing system 245. Alternatively, the first databases 205 can be included within first server 210. The second databases 207 may store information/data, as described herein. For example, the second databases 207 can include second physical objects database 225. The second physical objects database 225 can store information associated with physical objects disposed at a particular facility. In some embodiments, the first physical objects database 220 can store information associated with physical objects disposed at the facility in which the second computing system 250 is disposed. The second databases 207 and second server 212 can be located at one or more geographically distributed locations from each other or from the second computing system 250. Alternatively, the second databases 207 can be included within second server 210.

In an exemplary embodiment, a mobile device 260 can scan and decode a machine-readable element being displayed in a graphical user interface displayed by the second computing system to extract an identification of the second computing system. An application executing on the mobile device 260, such as an application associated with the first computing system, forwards the identification of the second computing system and an identifier of the user of the mobile device to the broker system. The identifier can be associated with an account tied to the first computing system 245. The broker system 200 can execute a retrieving engine 230 in response to receiving the identifier. The retrieving engine 230 can query the accounts database 235 using the identifier to retrieve account informant associated with the account. The account holder information can include a name of account holder, payment methods including account payment options, addresses, transaction history, e-receipts and account preferences. The broker system transmits a the first set of information to the second computing device for integration into the graphical user interface of the display. In one embodiment, the first set of information is displayed as an image on the graphical user interface of the second computing system 250 such as an electronic receipt image. In another embodiment, the information is presented as a textual representation listing electronic receipt information. The retrieving engine 230 can retrieve and integrate the e-receipts of the account holder with the graphical user interface of the display of the second computing system 250.

In an alternate embodiment, the second computing system 250 can display a machine-readable element encoded with an identifier associated with the second computing system 250. The mobile device can launch a retail store application which is connected to the account holder's account at the first computing system 245. The first computing system 245 can transmit an identifier associated with the second computing system 250 and an identifier associated with the account holder, to the broker system 200. It will be appreciated that other mechanisms for pairing the second computing system and the user's mobile device besides the scanning and reading mechanisms described herein may be conducted in order to provide the second computing system identification and the user identifier to the broker system and are within the scope of the present invention. The broker system 200 can execute the retrieving engine 230, in response to receiving the identifier, to query the accounts database 235 using the identifier to retrieve an account holder information associated with the identifier. The account holder information can include name of account holder, payment methods including mobile account payment options, addresses, transaction history, e-receipts and account preferences. The retrieving engine 230 can retrieve and integrate the e-receipts of the account holder with the graphical user interface of the display of the second computing system 250.

Subsequent to the integration of the e-receipts information of the account holder from the first computing system 245, with the graphical user interface of the display of the second computing system 250, the second computing system 250 can access all of the account holder's information from the first computing system related to the e-receipts. For example, the second computing system 250 can display various options related to the e-receipts. The second computing system 250 can provide the account holder the option to view all recent e-receipts of transactions completed via the first computing system. The second computing system 250 can display a brief summary of the e-receipts. Furthermore, the second computing system 250 can provide the option to view the actual e-receipt. In response to receiving the selection to view the e-receipt the retrieving engine 230 can retrieve an image of the e-receipt from the accounts database 235. The retrieving engine 230 can format and re-size the image for integration of the image of the e-receipt into the graphical user interface of the display of the second computing system 250.

In another example, the second computing system 250 can display an option for finding a receipt associated with the account. In response to selecting the option for finding a receipt, the account holder can scan a machine-readable element encoded with an identifier associated with an item. The retrieving engine 230 can query the accounts database 230 to retrieve any e-receipts that included that item. Furthermore, the retrieving engine 230 can query the accounts database 235 for e-receipts associated with an inputted data range, an item name, an item brand or a range of a total amount spent during the transaction. The retrieving engine 230 can format and re-size the image for integration of the image of the retrieved e-receipts on the graphical user interface of the display of the second computing system 250.

In another example, the second computing system 250 can display an option to print the e-receipts. In response to selecting the option for printing an e-receipt the retrieving engine 230 can control the printer coupled to the second computing system 250. The printer can print the image of the e-receipt. The second computing system 250 can also display an option to send the e-receipt as a gift receipt. In response to selecting the option to send a gift receipt the second computing system 250 can prompt the account holder to enter one or more e-mail addresses. The retrieving system 230 can edit, reformat the image of the e-receipt to be sent as a gift receipt. For example, the retrieving system can remove the pricing information from the e-receipts. The retrieving system 230 can attach the image of the e-receipt to an email and transmit the e-mail to the input one or more e-mail address. In an alternative embodiment, the account holder can select to print the gift receipt.

In another example, the account holder can complete a transaction of purchasing items at the second computing system 250. The account holder can scan the machine-readable element encoded with an identifier associated with an item at the second computing system 250. The retrieving engine 230 can query the second physical objects database 225 to retrieve the item information associated with the item. The item information can be displayed on the display of the second computing system 250. The account holder can select an option to store the receipt of the transaction as an e-receipt associated with the account. The retrieving engine 230 can store the e-receipt in the accounts database 230 associated with the account. The account holder can also select an option to turn on paper receipts at the second computing system 250. In response to selecting the option to turn on paper receipts the retrieving engine 230 can update the preferences of the account. The retrieving engine 230 can instruct the second computing system 230 to print the receipts for the account holder based on the selected preference of paper receipts.

Figure 3:
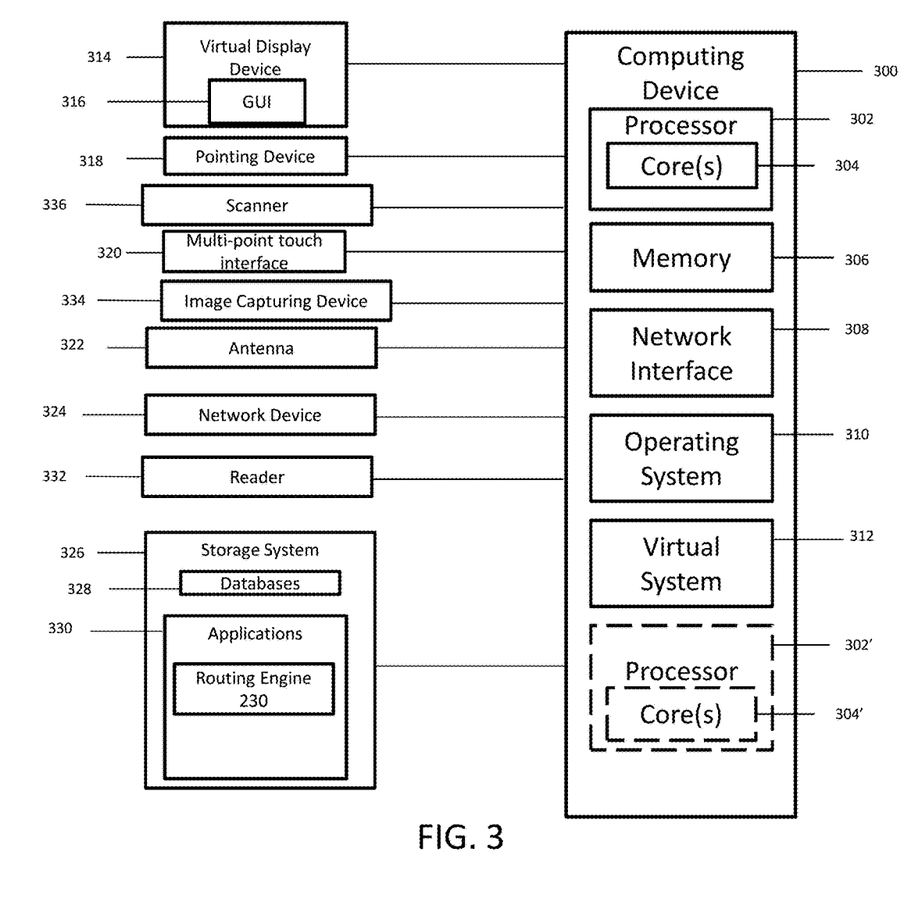
FIG. 3 is a block diagrams illustrating of an exemplary computing device in accordance with an exemplary embodiment.

FIG. 3 is a block diagram of an example computing device for implementing an exemplary embodiment. Computing device 300 can be used to implement embodiments of the retrieving engine, the mobile device, and the first and second computing systems. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the integration engine 230) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320, a pointing device 318, an scanner 336 and a reader 332.

The computing device 300 may also include one or more storage devices 326, such as a hard-drive, CD-ROM, or other computer readable media, for storing data and computer-readable instructions and/or software that implement exemplary embodiments (e.g., applications). For example, exemplary storage device 326 can include one or more databases 328 for storing information regarding available physical objects and account holder information. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run operating system 310, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
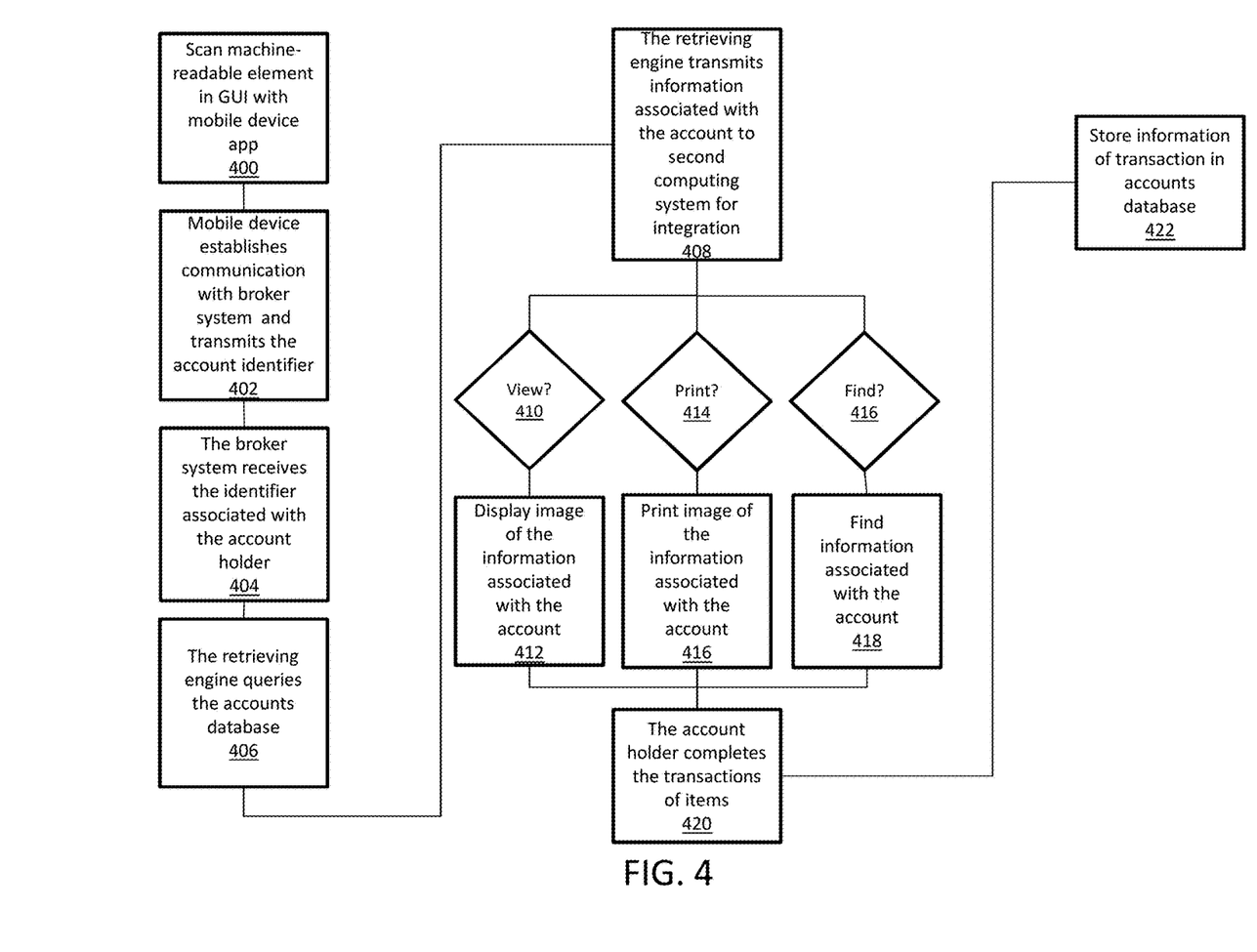
FIG. 4 is a flowchart illustrating an exemplary process in accordance with an exemplary embodiment.

FIG. 4 is a flowchart illustrating the process for the distributed data management system according to an exemplary embodiment. In operation 400, an account holder launches a mobile application on their mobile device and reads and decodes an identification of the second computing system being displayed in a graphical user interface as a machine-readable element by the second computing system In operation 402, the application executing on the mobile device, which may be associated with the first computing system, establishes communication with a broker system and provides the identification of the second computing system and an identifier associated with the account of the account holder to the broker system (e.g. broker system 200 as shown in FIG. 2). The account can be tied to the first computing system (e.g. first computing system 245 as shown in FIG. 2). n In operation 404, the broker system receives the identifier associated with the account of the account holder (and user of the mobile device in most cases) and executes the retrieving engine (e.g. retrieving engine 230 as shown in FIG. 2).

In operation 406, the retrieving engine queries the accounts database (e.g. accounts database 235 as shown in FIG. 2) using the identifier to retrieve the associated account holder information. The account holder information can include name of account holder, payment methods including mobile account payment options, addresses, transaction history, e-receipts and account preferences.

In operation 408, the retrieving engine can retrieve information associated with the account and transmit the information to the second computing device for integration with the graphical user interface of the second computing system. In one embodiment, the information can be e-receipts for transactions completed via the first computing system In operation 410, the account holder can select to view the e-receipt. In operation 412, the retrieving engine can format, resize the image of the e-receipt and transmit the image to the second computing system for display of the image of the e-receipt in the graphical user interface of the second computing system.

In operation 414, the account holder can select to print the e-receipt. In operation 416, The retrieving engine can instruct the second computing system to print the image of the e-receipt on the printer (e.g. printer 112 as shown in FIG. 1A). In operation 418, the account holder can select to find an e-receipt for a transaction completed in the virtual retail store. The retrieving engine can query and retrieve all e-receipts from the accounts database using a search criteria such as an identifier associated with an item, a data range, an item name, an item brand or a range of a total amount spent during the transaction.

In operation 420, the account holder can complete the transactions of items selected for purchase from the physical retail store in which the second computing system is disposed by scanning the machine-readable elements associated with the items. The account holder can choose to save the receipt of the transaction as an e-receipt by making a selection in the graphical user interface. In operation 424, the retrieving engine can store the receipt of the transaction in the accounts database in either a textual or image format In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present invention. Further still, other aspects, functions and advantages are also within the scope of the present invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A distributed data management system comprising:
    a first computing system communicatively coupled to a first database that is configured to store information associated with a plurality of accounts, the first computing system configured to implement a virtual retail store;
    a second computing system disposed in a physical retail facility, the second computing system including a display and communicatively coupled to a second database configured to store information associated with a plurality of items for purchase disposed in the physical retail facility, the second computing system configured to:
        display on the display a graphical user interface that includes a first machine-readable element encoded with an identification of the second computing system; and
    a broker system communicatively coupled to the first computing system and the second computing system and configured to:
        establish communication with an application executing on a user's mobile device, the user's mobile device interacting with the second computing system;
        receive from the application executing on the users mobile device an identification of the second computing system and a first identifier, the first identifier identifying the user of the mobile device interacting with the second computing system, the identification of the second computing system obtained by the application executing on the mobile device reading and decoding the first machine-readable element;
        retrieve from the first database a first set of information associated with a selected one of the plurality of accounts, the selected one of the accounts associated with the first identifier, wherein the first set of information is an image;
        transmit the first set of information to the second computing system for integration into the graphical user interface being displayed by the second computing system; and
        integrate into the graphical user interface being displayed by the second computing system the first set of information so as to display the first set of information as an image on the graphical user interface.

2. The system of claim 1 wherein the image is an electronic receipt.

3. The system of claim 1 wherein the second computing system is further configured to:
    generate a second set of information associated with at least one of the plurality of items for purchase; and
    display the second set of information as an image on the graphical user interface.

4. The system of claim 3 wherein the broker system is further configured to:
    transmit the second set of information to the first computing system for storage in the first database, the stored second set of information associated with the account that is associated with the first identifier.

5. The system of claim 4 wherein the broker system is further configured to:
    retrieve from the first database the second set of information associated with the selected one of the plurality of accounts; and
    integrate the second set of information into the graphical user interface of the display so as to display the second set of information as a second image on the graphical user interface.

6. The system of claim 5 wherein the second image is an electronic receipt.

7. The system of claim 1, wherein the first computing system, the second computing system and the broker system are in different geographic locations.

8. A method performed by a distributed computing system, the method comprising:
    storing information associated with a plurality of accounts in a first database, via a first computing system communicatively coupled to the first database, the plurality of accounts accessible by a first computing system configured to implement a virtual retail store;
    displaying a graphical user interface on a display, via a second computing system disposed in a physical retail facility that includes the display and is communicatively coupled to a second database storing information associated with a plurality of items for purchase disposed in the physical retail facility the graphical user interface including a first machine-readable element encoded with an identification of the second computing system;
    establishing communication between a broker system and an application executing on a user's mobile device, the users mobile device interacting with the second computing system;
    receiving at the broker system from the application executing on the user's mobile device an identification of the second computing system and a first identifier, the first identifier identifying the user of the mobile device interacting with the second computing system, the identification of the second computing system obtained by the application executing on the mobile device reading and decoding the first machine-readable element, the broker system communicatively coupled to the first computing system and the second computing system;
    retrieving from the first database a first set of information associated with a selected one of the plurality of accounts, the selected one of the accounts associated with the first identifier, the retrieving performed via the broker system, wherein the first set of information is an image;
    transmitting the first set of information from the broker system to the second computing system for integration into the graphical user interface of the display being displayed by the second computing system; and
    integrating into the graphical user interface being displayed by the second computing system the first set of information so as to display the first set of information as an image on the graphical user interface.

9. The method of claim 8, wherein the image is an electronic receipt.

10. The method of claim 8, further comprising:
    generating a second set of information associated with the plurality of items for purchase; and
    displaying the second set of information as an image oat the graphical user interface.

11. The method of claim 10, further comprising:
    transmitting, via the broker system, the second set of information to the first computing system for storage in the first database, the stored second set of information associated with the account that is associated with the first identifier.

12. The method of claim 11, further comprising:
retrieving from the first database the second set of information associated with the selected one of the plurality of accounts via the broker system; and
integrating the second set of information into the graphical user interface of the display so as to display the second set of information as a second image on the graphical user interface.

13. The method claim 12 wherein the second image is an electronic receipt.

14. The method of claim 8, wherein the first computing system, the second computing system and the broker system are in different geographic locations.

15. The method of claim 8, wherein the broker system captures the first set of information as an image m response to receiving a selection of the set of information.

16. A non-transitory computer readable memory medium storing instructions for distributed data management, wherein the instructions are executable by a processor to:
store information associated with a plurality of accounts in a first database, via a first computing system communicatively coupled to the first database, the plurality of accounts accessible by a first computing system configured to implement a virtual retail store;
display a graphical user interface on a display, via a second computing system disposed in a physical retail facility that includes the display and is communicatively coupled to a second database storing information associated with a plurality of items for purchase disposed in the physical retail facility, the graphical user interface including a first machine-readable element encoded with an identification of the second computing system;
establish communication between a broker system and an application executing on a user's mobile device the user's mobile device interacting with the second computing system;
receive at the broker system from the application executing on the user's mobile device an identification of the second computing system and a first identifier, the first identifier identifying the user of the mobile device interacting with the second computing system, the identification of the second computing system obtained by the application executing on the mobile device reading and decoding the first machine-readable element, the broker system communicatively coupled to the first computing system and the second computing system;
retrieve from the first database a first set of information associated with a selected one of the plurality of accounts, the selected one of the accounts associated with the first identifier, the retrieving performed via the broker system, wherein the first set of information is an image;
transmit the first set of information from the broker system to the second computing system for integration into the graphical user interface of the display being displayed by the second computing system; and
integrate into the graphical user interface being displayed by the second computing system the first set of information so as to display the first set of information as an image on the graphical user interface.

17. The non-transitory computer readable memory, medium in claim 16, wherein the instructions are further executable to:
generate a second set of information associated with the plurality of items for purchase; and
display the second set of information as an image oat the graphical user interface.

18. The non-transitory computer readable memory medium in claim 17, wherein the instructions are further executable to:
transmit, via the broker system, the second set of information to the first computing system for storage in the first database, the stored second set of information associated with the account that is associated with the first identifier.

19. The non-transitory computer readable memory medium in claim 18, wherein the instructions are further executable to:
retrieve from the first database the second set of information associated with the selected one of the plurality of accounts via the broker system; and
integrate the second set of information into the graphical user interface of the display so as to display the second set of information as an image on the graphical user interface.

20. The system of claim 1, wherein the broker system is further configured to format or resize the image.

* * * * *

UNITED STATES PATENT AND TRADEMARK OFFICE
CERTIFICATE OF CORRECTION

PATENT NO. : 11,120,415 B2  
APPLICATION NO. : 15/702056  
DATED : September 14, 2021  
INVENTOR(S) : Ryner et al.

Page 1 of 1

It is certified that error appears in the above-identified patent and that said Letters Patent is hereby corrected as shown below:

In the Claims

At Column 11, Line 27, Claim 1, delete "users" and replace with -- user's --.

At Column 12, Line 22, Claim 8, delete "facility" and replace with -- facility, --.

At Column 12, Line 28, Claim 8, delete "users" and replace with -- user's --.

At Column 12, Line 60, Claim 10, delete "oat" and replace with -- on --.

At Column 13, Line 9, Claim 13, after "method" insert -- of --.

At Column 13, Line 15, Claim 15, delete "m" and replace with -- in --.

At Column 13, Line 35, Claim 16, delete "device" and replace with -- device, --.

At Column 14, Line 18, Claim 17, delete "memory," and replace with -- memory --.

At Column 14, Line 23, Claim 17, delete "oat" and replace with -- on --.

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*